United States Patent [19]

Bender et al.

[11] Patent Number: 4,838,086
[45] Date of Patent: Jun. 13, 1989

[54] METHOD FOR MEASURING THE WALL THICKNESS OF A WORKPIECE BY ULTRA-SOUND

[75] Inventors: Rudolf Bender, Lich; Jörg Quittkat, Neuberg, both of Fed. Rep. of Germany

[73] Assignee: Nukem GmbH, Hanau, Fed. Rep. of Germany

[21] Appl. No.: 138,730

[22] Filed: Dec. 29, 1987

[30] Foreign Application Priority Data

Jan. 3, 1987 [DE] Fed. Rep. of Germany ....... 3700086

[51] Int. Cl.$^4$ ............................................ G01N 29/00
[52] U.S. Cl. ........................................ 73/597; 73/901
[58] Field of Search ................. 73/597, 611, 615, 627, 73/629, 901

[56] References Cited

U.S. PATENT DOCUMENTS

| 4,388,830 | 6/1983 | Narushima et al. | 73/597 |
| 4,471,657 | 9/1984 | Voris et al. | 73/597 |
| 4,658,648 | 4/1987 | Roddeck et al. | 73/597 |

OTHER PUBLICATIONS

Krautkramer et al., *Ultrasonic Testing of Materials*, 3rd. edn. (Springer-Verlag, New York) 1983, pp. 278-286.

Primary Examiner—John Chapman
Attorney, Agent, or Firm—Beveridge, DeGrandi & Weilacher

[57] ABSTRACT

A method and an apparatus for measuring the wall thickness of a workpiece by ultra-sound is disclosed. For measuring the wall thickness, it is necessary to determine the time interval between a surface echo occurring during irradiation by ultra-sound and a rear wall echo. According to the present invention, a saw tooth generator generates a saw tooth signal including a sequence of saw teeth when the surface echo occurs. Each of the saw teeth causes a counting pulse to be generated. Upon occurrence of the rear wall echo, the instantaneous amplitude value of the saw tooth signal is measured and the number of counting pulses is recorded by a counter. Each counting pulse defines a constant unit of wall thickness. The amplitude value provides a fraction of such wall thickness unit.

8 Claims, 2 Drawing Sheets

METHOD FOR MEASURING THE WALL THICKNESS OF A WORKPIECE BY ULTRA-SOUND

BACKGROUND OF THE INVENTION

The present invention relates to a method for measuring the wall thickness of a workpiece by ultra-sound, in which the surface echo of an ultrasonic wave generates a start pulse and the rear wall echo generates a stop pulse for a saw tooth generator and in which the amplitude of a saw tooth obtained when the stop pulse occurs provides a measure for the wall thickness.

For measuring the wall thickness of a workpiece by ultra-sound one records the surface echo and the rear wall echo obtained when irradiating ultrasonic waves perpendicularly upon the said surfaces, and measures the interval between the two echoes. This interval then provides a measure for the thickness of the workpiece. The recorded echoes cause corresponding triggering signals to be generated by the evaluation circuit.

The interval is measured by either of two methods. According to a first, namely an analog method of the type known from U.S. Pat. No. 3,427,866, the triggering signal produced by the surface echo starts a saw tooth generator which generates a signal rising linearly from zero. At the moment when the second triggering signal, the one produced by the rear wall echo, occurs one measures the instantaneous amplitude of the signal of the saw tooth generator. This analog method provides the disadvantage that the rising flank of the saw tooth must be very steep if high resolution is desired for the interval measurements. This however, considerably restricts the total measuring range.

According to the second, namely the digital evaluation method, one measure high-frequency counting pulses occurring between the two triggering signals. If in this case high resolution is desired for the interval measurements, the counting pulses must have a very high frequency. For example, if a resolution of 1 micron is desired in the case of steel, the counting pulses must have a frequency of approximately 3 GHz. Such high frequencies can be controlled only with a very considerable input in circuitry.

German Disclosure Document No. 31 26 138 describes a digital evaluation method of this type. However, in order to improve the resolution while reducing the counting frequency to every second triggering signal, the counting pulses are shifted in this case by a pre-determined phase angle. One then counts the number of counting pulses occurring between the two triggering signals over a given number of measuring cycles and determines thereafter the wall thickness by dividing the number of counting pulses by the number of measuring cycles.

According to the method known from German Disclosure Document No. 34 29 409, the residual time remaining after appearance of the second triggering pulse is recorded as a fraction of a counting pulse. The residual time is than also counted according to the Nenius principle by detuning an oscillator.

SUMMARY OF THE INVENTION

Now, it is the object of the present invention to improve this method so that the wall thickness can be measured with very high resolution over a very large range of wall thicknesses.

This object is achieved according to the invention by the fact that the saw tooth generator generates a sequence of equal triangular saw teeth, that a counting pulse is generated at each reversal point of the signal curve of the saw teeth and that the number of the counting pulses produced before the stop pulse appears and the amplitude of a saw tooth existing when the stop pulse appears are recorded by an adder, each counting pulse defining a constant unit of the wall thickness of the amplitude defining a fraction of this unit of the wall thickness.

BRIEF DESCRIPTION OF THE DRAWINGS

Other details, advantages and features of the invention will become apparent not only from the claims and the features to be derived from the latter—individually and/or in combinations thereof—but also from the following description of certain preferred embodiments of the invention which are represented in the drawing in which

DETAILED DESCRIPTION OF THE PREFERRED EMBODIMENTS

When an ultrasonic signal (20) is generated by a measuring head, then this signal is reflected by the surface of the workpiece whereby a surface echo (2) is produced. The ultrasonic waves penetrating into the workpiece are reflected by the opposite rear wall of the workpiece and, accordingly, received by the measuring head as rear wall echoes (22).

Figure 1:
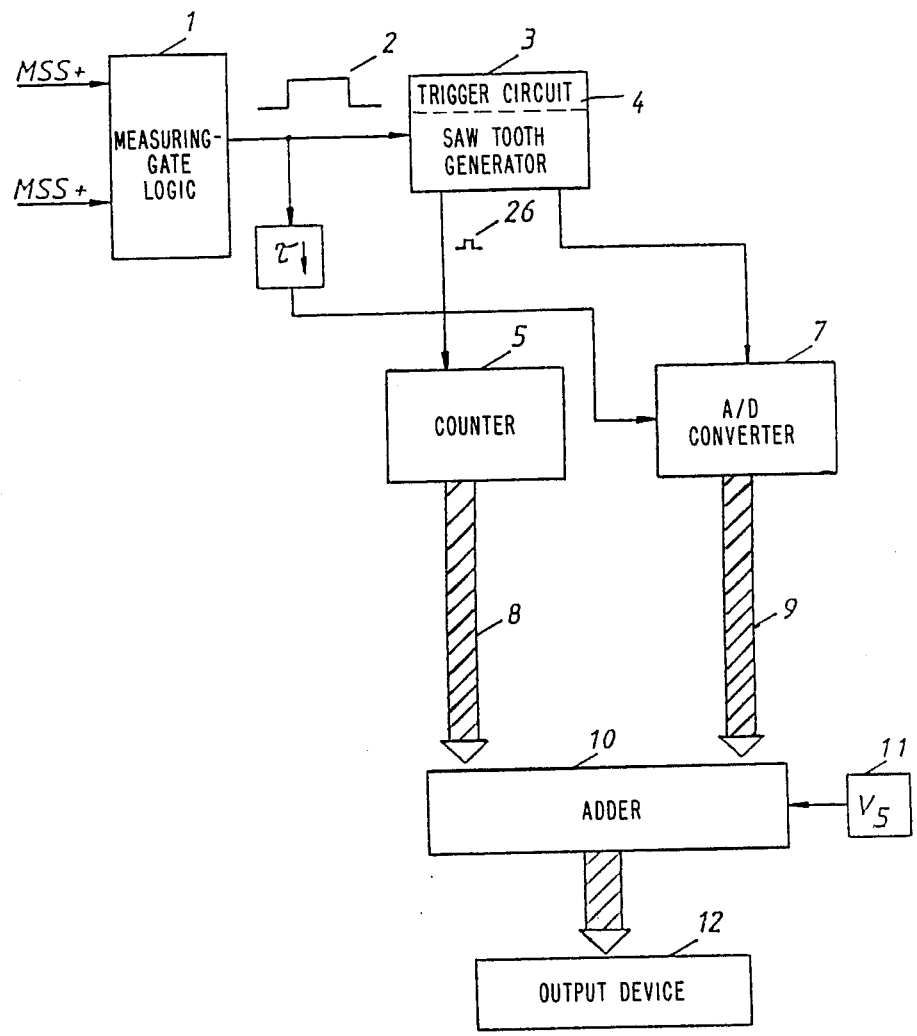
FIG. 1 shows one embodiment of a circuit arrangement for carrying out the method according to the invention.
Figure 2:
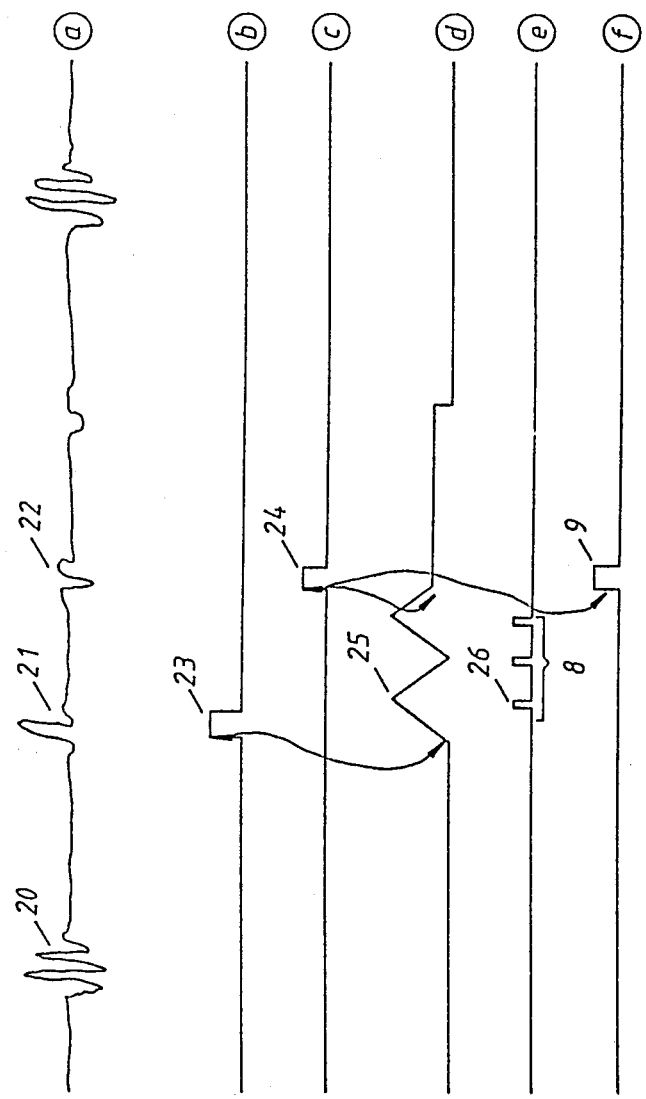
FIG. 2 shows curves of the type encountered when carrying out the measurements.

These conditions are illustrated in FIG. 2a. The surface echo (21) and the rear wall echo (22) are supplied to a logical measuring-gate circuit (1) where the surface echo (21) produces a triggering pulse (23) according to FIG. 2b, while the rear wall echo (22) produces a second triggering pulse (24) according to FIG. 2c. The measured wall thickness is determined by the time interval between the rising flanks of the two rectangular triggering pulses (23 and 24). These two rising flanks define the beginning and the end of the output signal (2) of the logical measuring-gate circuit. The output signal (2) constitutes the so-called measuring gate.

It is supplied to a saw tooth generator (3) which generates a sequence of saw teeth (25) of stable frequency and exhibiting symmetrical rising and dropping flanks, as can be seen in FIG. 2d. The saw tooth generator (3) is started when the rising flank of the signal (2) appears. A trigger circuit 4 provided in the saw tooth generator (3) generates a counting pulse (26) every time a change in direction occurs in the saw tooth curve (25). The counting pulses (26) are supplied from the saw tooth generator to a counter (5).

When the dropping flank of the rectangular output signal (2) appears, corresponding to the appearance of the rising flank of the triggering signal (24), the instantaneous analog value of the saw tooth signal is recorded. If the dropping flank of the output signal (2) coincides with a rising flank of the saw tooth signal (25), then this amplitude value is supplied directly to an analog-to-digital converter (7). However, when the dropping flank of the signal (2) coincides with a dropping flank of the saw tooth signal (25), then the converter (7) is supplied with a value equal to the maximum amplitude of the saw teeth (25), reduced by the instantaneous amplitude value. This means that the converter (7) is in this case supplied with the complementary value. As soon as the dropping flank of the signal (2) appears, the saw tooth generator (3) is stopped. The contents of the counter (5) is input into an adder (10). In addition, the before-mentioned analog value (9), which had been supplied from the saw tooth generator (3) to the converter 7, is converted to a digital value and supplied to the adder (10).

The digital signals supplied to the adder (10) are weighted by the latter as follows:

Every counting pulse (26) corresponds to one unit of wall thickness (E) while the analog value (9) corresponds to part of this unit of wall thickness (E). The greater the analog signal (9), the greater is the said part. In the embodiment illustrated in FIG. 2, three counting pulses (26) are encountered which means that the wall thickness corresponds to three units of wall thickness (E). The analog signal (9) corresponds, for example, to a value 0.8 E, so that the wall thickness measured is equal to 3.8 E. If the ultrasonic waves pass a length of 2 mm of the workpiece between the occurrence of two counting pulses (26), then the unit of wall thickness E of equal to 2 mm. This means that the wall thickness of 7.6 mm has been measured in the example just described.

The sum formed by the adder (10) is multiplied by the factor (11) determined by the sound velocity, i.e. by the unit of wall thickness, and the value of the wall thickness so obtained is output by an output device (12), denominated in millimeters.

Although no particular demands are placed either upon the analog or upon the digital part of the circuit arrangement, one still obtains very high resolution of the measured value.

The saw tooth generator (3) may also produce a sequence of saw teeth exhibiting an inclined rising flank and a vertical dropping flank. The counting pulses (26) are generated every time the vertical dropping flank appears. In this case, it is not necessary for the saw tooth generator (3) to supply a complementary value to the converter (7). Rather, the converter (7) is always supplied with the instantaneous amplitude value of a saw tooth given at the moment when the dropping flank of the signal (2) appears.

The method can be applied similarly when the wall thickness is recorded as the time interval between two rear wall echoes, for example.

I claim:

1. Method for measuring the wall thickness of a workpiece by ultra-sound, in which the surface echo of an ultrasonic wave generates a start pulse and the rear wall echo generates a stop pulse for a saw tooth generator and in which the amplitude of a saw tooth signal obtained when the stop pulse occurs provides a measure for the wall thickness, said method comprising the steps of generating a sequence of equal triangular saw teeth in response to the start pulse, generating a counting pulse corresponding to each reversal point of the signal curve of the saw teeth, and adding the number of counting pulses generated before the stop pulse appears and a value represented by the amplitude of a saw tooth existing when the stop pulse appears, each counting pulse defining a constant unit of the wall thickness and the value represented by the amplitude defining a fraction of the unit of the wall thickness.

2. Method according to claim 1, wherein the saw teeth comprise rising and dropping flanks which extend symmetrically relative to each other.

3. Method according to claim 1, wherein the saw teeth exhibit vertical dropping flanks and that a counting pulse is generated corresponding to each dropping flank.

4. Method according to claim 1, further comprising the steps of providing a digital value corresponding to the value represented by the amplitude, summing the number of counting pulses and the digital value to provide a sum, and multiplying the sum by a factor determined by the sound velocity.

5. Method according to claim 2, wherein the value represented by the amplitude is directly added to the number of counting pulses in the case of a rising flank and, in the case of a dropping flank, a value complementary of the value represented by the amplitude, relative to the maximum amplitude of the saw teeth is added to the number of counting pulses.

6. Apparatus for measuring a wall thickness of a workpiece with an ultrasonic wave, said apparatus comprising:

means for providing a start signal corresponding to a surface echo of the ultrasonic wave and a stop signal corresponding to a rear wall echo of the wave;

means including a saw tooth generator for generating a sequence of identical, triangular, saw tooth signals in response to said start signal and a counting-pulse generator for generating counting-pulses indicative of each reversal of the saw tooth signal in response to said start signal and terminating generation of said counting-pulses in response to said stop signal;

a counter connected to said saw tooth generator for counting said counting-pulses;

an analog-to-digital converter connected to said saw tooth generator for converting the amplitude of said saw tooth signal present when said stop pulse occurs to a corresponding digital value represented by at least one digital value pulse; and an adder connected to said counter and said converter for forming a sum from said counting pulses and said at least one digital value pulse, each of said counting pulses defining a constant unit of wall thickness and said at least one digital value pulse defining a fraction of said unit of wall thickness.

7. An apparatus as claimed in claim 6, wherein said counting-pulse generator comprises a trigger circuit.

8. An apparatus as claimed in claim 6, wherein said adder comprises a multiplier for multiplying said sum by a factor corresponding to a unit of wall thickness to provide a product which is output by said adder.

* * * * *